(12) United States Patent
Li et al.

(10) Patent No.: US 8,737,604 B2
(45) Date of Patent: May 27, 2014

(54) PROCESSOR WITH ARCHITECTURE IMPLEMENTING THE ADVANCED ENCRYPTION STANDARD

(75) Inventors: Weifeng Li, Milpitas, CA (US); Kevin A. Hurd, Ft. Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 266 days.

(21) Appl. No.: 13/103,591

(22) Filed: May 9, 2011

(65) Prior Publication Data

US 2012/0288085 A1 Nov. 15, 2012

(51) Int. Cl.
*G06F 21/00* (2013.01)
*H04L 9/06* (2006.01)
*H04L 9/00* (2006.01)

(52) U.S. Cl.
CPC ................ *H04L 9/0631* (2013.01); *H04L 9/00* (2013.01)
USPC ............................................ 380/28; 713/189

(58) Field of Classification Search
CPC ........... H04L 9/00; H04L 9/06; H04L 9/0618; H04L 9/0631
USPC .......................................................... 380/28
See application file for complete search history.

(56) References Cited

U.S. PATENT DOCUMENTS

| | | | |
|---|---|---|---|
| 6,333,983 B1 | 12/2001 | Enichen et al. | |
| 7,159,122 B2 | 1/2007 | Lundvall et al. | |
| 7,257,718 B2 | 8/2007 | Lundvall et al. | |
| 7,321,910 B2 | 1/2008 | Crispin et al. | |
| 7,392,400 B2 | 6/2008 | Henry et al. | |
| 7,502,943 B2 | 3/2009 | Henry et al. | |
| 7,532,722 B2 | 5/2009 | Crispin et al. | |
| 7,539,876 B2 | 5/2009 | Henry et al. | |
| 7,720,220 B2 | 5/2010 | Lundvall et al. | |
| 7,785,736 B2 | 8/2010 | Oh et al. | |
| 2004/0184602 A1* | 9/2004 | Nadehara | 380/28 |
| 2004/0230713 A1 | 11/2004 | Brice, Jr. et al. | |
| 2005/0089160 A1 | 4/2005 | Crispin et al. | |
| 2005/0147239 A1* | 7/2005 | Chin et al. | 380/28 |
| 2010/0153747 A1* | 6/2010 | Asnaashari et al. | 713/193 |
| 2010/0246814 A1 | 9/2010 | Olson et al. | |

OTHER PUBLICATIONS

Gueron, S., "Advanced Encryption Standard (AES) Instruction Set", White Paper, Intel Corporation, Apr. 2008.*

(Continued)

*Primary Examiner* — Yogesh Paliwal

(57) ABSTRACT

Methods and apparatus are provided for implementing the advanced encryption standard. The apparatus comprises a first multiplexer receiving during a first cycle a data word, a substitution transformation of the data word and inverse substitution transformation of the data word to provide a first output. During the next cycle, a second multiplexer receives the first output, a mixed column transformation of the first output and an inverse mixed column transformation of the first output to provide a second output. Also in the next cycle, the second output is added to a round key to provide one round of an encoded or decoded digital word compliant with the advanced encryption standard with cycle-by-cycle throughput. The method comprises shifting a received data word and processing the shifted data word using a substitution transformation (encoding) or an inverse substitution transformation (decoding) during a first cycle in an advanced encryption standard unit of a processor. In the next cycle, the result from the first cycle is processed using a mixed column transformation (encoding) or an inverse mixed column transformation (decoding) and the result is added to a round key to provide one round compliant with the advanced encryption with cycle-by-cycle throughput.

13 Claims, 8 Drawing Sheets

(56) References Cited

OTHER PUBLICATIONS

Gueron, S., Advanced Encryption Standard (AES) Instruction Set, White Paper, Intel Corporation, Apr. 2008.

Federal Information Processing Standard Publication 197, Announcing the Advanced Encryption Standard (AES), Nov. 26, 2001.

* cited by examiner

PROCESSOR WITH ARCHITECTURE IMPLEMENTING THE ADVANCED ENCRYPTION STANDARD

TECHNICAL FIELD

The technical field relates to information or data processors, and more particularly relates to a processor having an architecture for implementing the Advanced Encryption Standard promulgated by National Institute of Standards and Technology (NIST) as published in Federal Information Processing Standards (FIPS) Publication 197.

BACKGROUND

Information technology is a pervasive and critically important aspect of modern society. Information or data security is one of the paramount issues that impacts the acceptability of an information system's operations. Keeping data secure necessitates protection from unauthorized viewing, modification or destruction of the information.

Approaches to the security of information include encrypting the data to prevent its reading by an unauthorized entity. Encryption based security methods endeavor to prohibit data from being comprehended if received or accessed without proper authorization. Encryption methods generally utilize a mathematical algorithm to transform the legible data (plaintext) into an encrypted form (ciphertext), that cannot be comprehended without the knowledge and use of a key to decrypt the encrypted data.

On Nov. 26, 2001, NIST announced the Advance Encryption Standard (AES) in FIPS Publication 197. The AES uses the Rijndael cipher proposed by Vincent Rijmen and Joan Daemen September, 1999. Rijndael is a 128-bit symmetric block cipher that accepts a variable-length key of 128, 192, or 256-bits. The Rijndael algorithm is a now a well-known technology in the field of encryption, and is explicated in depth at the publicly accessible NIST website. FIPS Publication 197 is incorporated fully herein by reference thereto.

In April, 2008, Intel promulgated a White Paper describing Intel's new set of Single Instruction Multiple Data (SIMD) instructions for data encryption and decryption in compliance with FIPS Publication 197. Of the six defined instructions, four are dedicated to encryption and decryption, while the remaining two instructions support the AES key expansion procedure. The Intel White Paper entitled "Advanced Encryption Standard (AES) Instructions Set" is hereby fully incorporated herein by reference thereto.

However, to implement these AES instructions in a processor, an architecture must be defined to process the instructions in as efficient a manner as possible. Prior architecture implementations require multiple cycles of throughput to execute each instruction, resulting in reduced performance since the prior implementations are not fully pipelined.

Brief Summary Of Embodiments

A method is provided for implementing the advanced encryption standard. The method comprises shifting a received data word and processing the shifted data word using a substitution transformation during a first cycle in an advanced encryption standard unit of a processor. In the next cycle, the result from the substitution transformation is processed using a mixed column transformation and the result of the mixed column transformation is added to a round key to provide one round of an encoded digital word compliant with the advanced encryption with cycle-by-cycle throughput.

A method is provided for implementing the advanced encryption standard. The method comprises shifting a received data word and processing the shifted data word using an inverse substitution transformation during a first cycle in an advanced encryption standard unit of a processor. In the next cycle, the result from the inverse substitution transformation is processed using an inverse mixed column transformation and the result of the inverse mixed column transformation is added to a round key to provide one round of an decoded digital word compliant with the advanced encryption with cycle-by-cycle throughput.

An apparatus is provided for implementing the advanced encryption standard. The apparatus comprises a first multiplexer receiving during a first cycle a data word, a substitution transformation of the data word and inverse substitution transformation of the data word to provide a first output. During the next cycle, a second multiplexer receives the first output, a mixed column transformation of the first output and an inverse mixed column transformation of the first output to provide a second output. Also in the next cycle, the second output is added to a round key to provide one round of an encoded or decoded digital word compliant with the advanced encryption standard with cycle-by-cycle throughput.

BRIEF DESCRIPTION OF THE DRAWINGS

Embodiments of the present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Moreover, as used herein, the word "processor" encompasses any type of information or data processor, including, without limitation, Internet access processors, Intranet access processors, personal data processors, military data processors, financial data processors, navigational processors, voice processors, music processors, video processors or any multimedia processors. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, the following detailed description or for any particular encryption algorithm.

Figure 1:
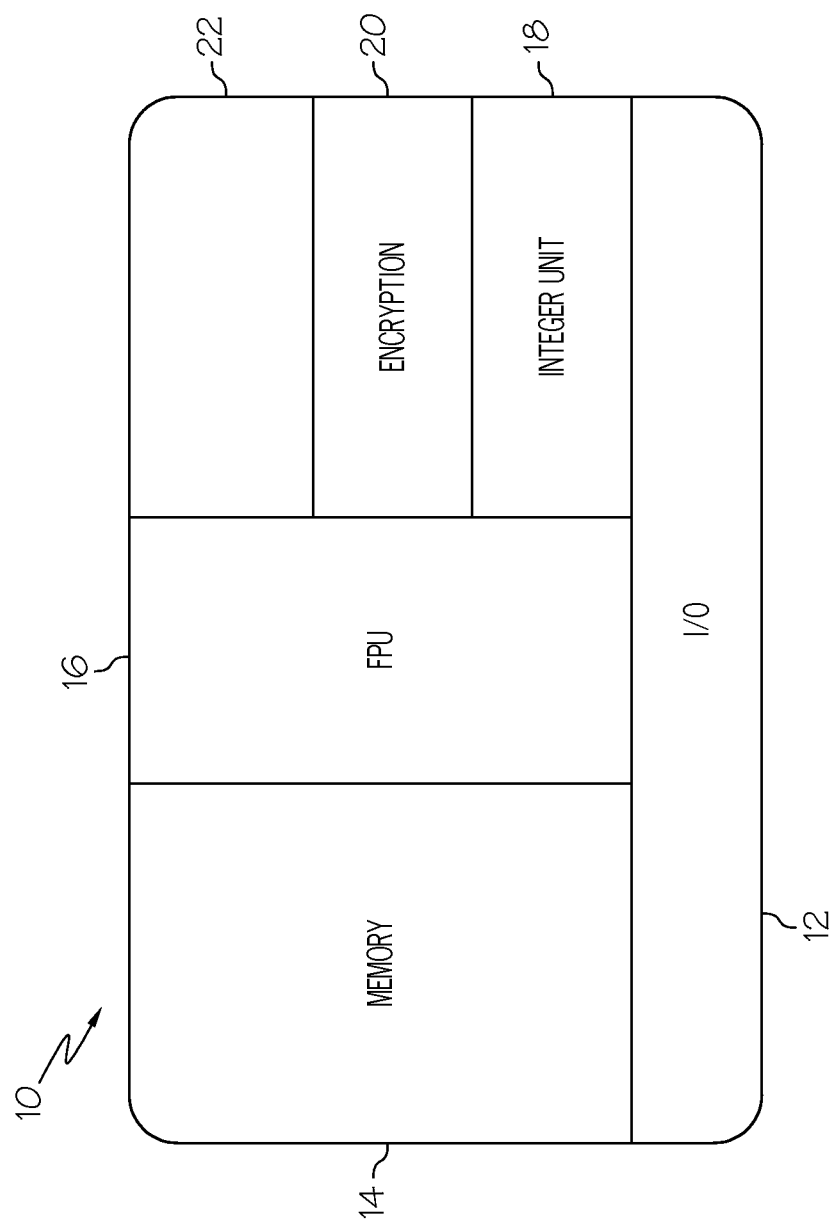
FIG. 1 is a simplified exemplary block diagram of processor suitable for use with embodiments of the present disclosure.

Referring now to FIG. 1, a simplified exemplary block diagram is shown illustrating a processor 10 suitable for use with the embodiments of the present disclosure. In some embodiments, the processor 10 would be realized as a single core in a large-scale integrated circuit (LSIC). In other embodiments, the processor 10 could be one of a dual or multiple core LSIC to provide additional functionality in a single LSIC package. As is typical, processor 10 includes an input/output (I/O) section 12 and a memory section 14. The memory 14 can be any type of suitable memory. This would include the various types of dynamic random access memory (DRAM) such as SDRAM, the various types of static RAM (SRAM), and the various types of non-volatile memory (PROM, EPROM, and flash). In certain embodiments, additional memory (not shown) "off chip" of the processor 10 can be accessed via the I/O section 12. The processor 10 may also include a floating-point unit (FPU) 16 that performs the float-point computations of the processor 10 and an integer processing unit 18 for performing integer computations. Additionally, the processor 10 includes an encryption unit 20, which in one embodiment, comprises an AES unit configured to execute instructions that implement various portions of a block cipher algorithm that is compliant with the AES algorithm, as defined by Federal Information Processing Standards Publication 197(FIPS 197), dated Nov. 26, 2001. Various other types of units (generally 22) as desired for any particular processor microarchitecture may also be included.

Figure 2:
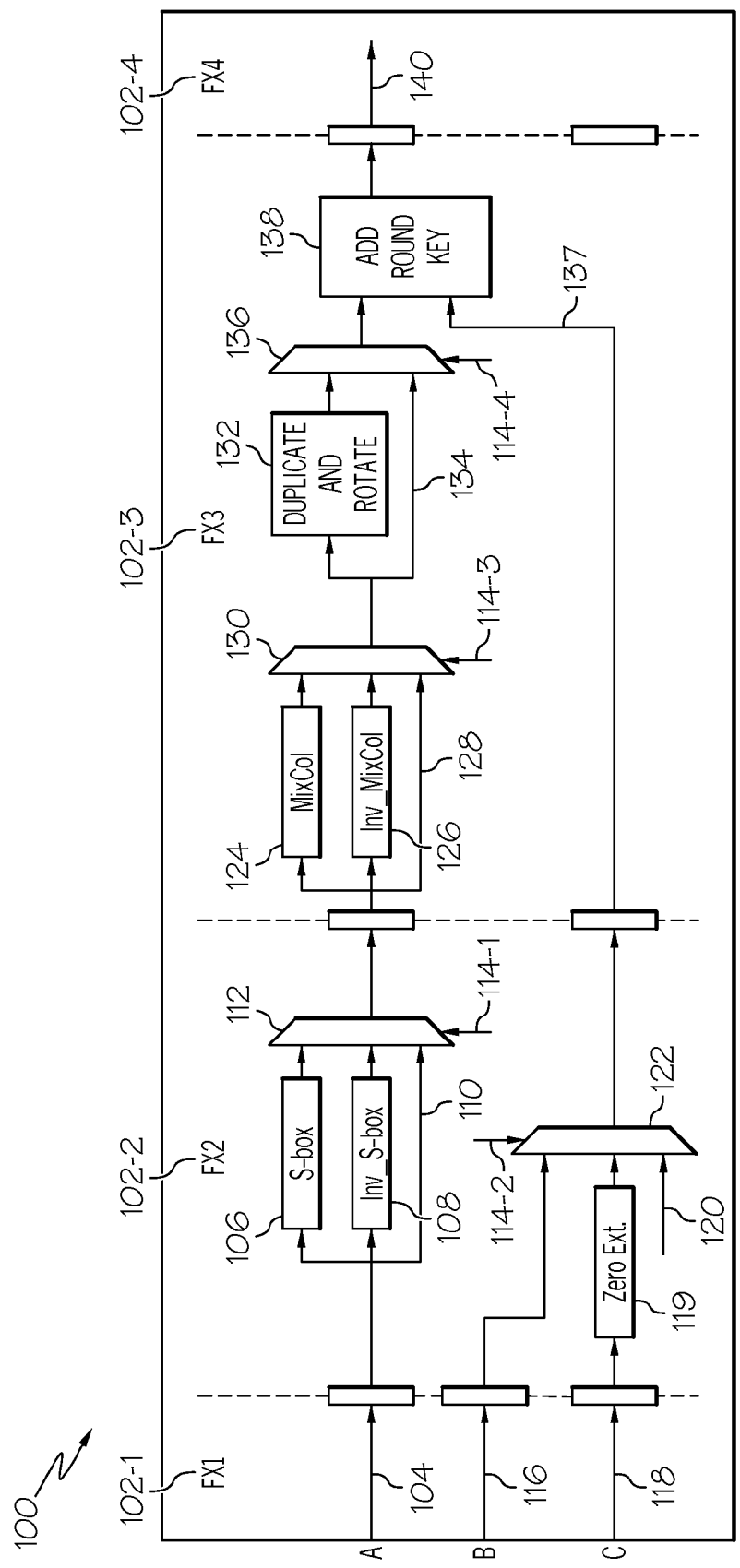
FIG. 2 is an exemplary block diagram of an AES architecture suitable for use with the processor of FIG. 1.

Referring now to FIG. 2, a block diagram of an AES hardware architecture 100 in accordance with an exemplary embodiment is shown. In one embodiment, the AES unit 100 may be configured to execute instructions that implement various portions of a block cipher algorithm that is compliant with the AES algorithm, as defined by Federal Information Processing Standards Publication 197 (FIPS 197), dated Nov. 26, 2001 (also referred to herein as the "AES Cipher"). Generally speaking, the AES Cipher is a block cipher that performs encryption/decryption of a 128-bit data block using an initial cipher key having a size of 128, 192 or 256 bits. The selected initial key may be supplied with the data block to be encrypted/decrypted or may be selected from a collection of stored initial keys. The AES cipher can be broken down into three sections: key expansion, encryption, and decryption. The AES Cipher uses a number of iterative loops or "rounds" to encrypt or decrypt a data block. Accordingly, the initial key is expanded into keys for each round ("round keys"), and AES Cipher key lengths of 128, 192 and 256 bits require 10, 12 and 14 rounds, respectively, for encryption or decryption of a block of data.

According to various embodiments of the present disclosure, a single AES architecture (unit) 100 is used for to perform AES key expansion, encryption, and decryption. In one embodiment, the AES unit 100 comprises part of a processor core that provides instruction decoding, clock cycles, memory and temporary data registers as is known in the art. In other embodiments, the AES unit 100 could be formed as a separate component and used with other processor or processor-based devices to implement the AES Cipher in such devices.

As illustrated in FIG. 2, the AES unit 100 receives an input (A) 104 via a 64 bit bus. During encryption or decryption operations, input 104 receives clear text (to be encrypted) or cipher text (to be decrypted). During key expansion, input 104 receives the initial key and prior round keys until all of the round keys have been generated and stored for a encryption or decryption session. As previously mentioned, the AES algorithm consists of sequences of 128 bits. However, only the AES shift row function need be performed on the entire 128 bits. This results from the exchanging of 8 bit data words across the upper and lower 64 bits of the 128 bit word. Accordingly, the AES unit 100 of the present disclosure performs the remaining AES functions (i.e., substitution transfer, mix column transfer and round key addition) in 64 bit words to simplify microarchitecture implementation. In one embodiment, a second AES unit 100 is used to process simultaneously process the other 64 bits of a 128 bit block so that the entire 128 bit block is processed together. In another embodiment, a single AES unit 100 could be used to multiplex 64 bit blocks through the AES unit, albeit as some cost of throughput and latency for the same 128 bit block.

Referring still to FIG. 2 the 64 bit data word is received on input (A) 104 in a first operational cycle FX1 (102-1), processed during the next two operational cycles FX2 (102-2) and FX3 (102-3) and output during cycle FX4 (102-4). As will hereinafter described more fully, this embodiment of the AES unit 100 achieves a single (every) cycle throughput of data words with a two-cycle latency for both encode and decode operations of the AES Cipher (albeit, additional cycles are required for the shift row function for the complete AES encode/decode process).

During cycle FX2 (102-2) the received data word is processed by a substitution box transformation 106 and an inverse substitution box transformation 108 (the data word is also passed without processing via bus 110). A substitution box (S-box) transformation comprises a non-linear substitution table used for byte substitution in a one-for-one substitution of a byte value. This is because the basic unit for processing the AES algorithm is a byte; that is, a sequence of eight bits treated as a single entity. The input and output for both encode and decode are processed as arrays of bytes that are formed by dividing the input and output data words into groups of contiguous bits to form arrays of bytes.

In matrix form, the S-box 106 transformation can be expressed as:

$$\begin{bmatrix} b'_0 \\ b'_1 \\ b'_2 \\ b'_3 \\ b'_4 \\ b'_5 \\ b'_6 \\ b'_7 \end{bmatrix} = \begin{bmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{bmatrix} \begin{bmatrix} b_0 \\ b_1 \\ b_2 \\ b_3 \\ b_4 \\ b_5 \\ b_6 \\ b_7 \end{bmatrix} + \begin{bmatrix} 1 \\ 1 \\ 0 \\ 0 \\ 0 \\ 1 \\ 1 \\ 0 \end{bmatrix}.$$

While in hexadecimal form, the S-box 106 transformation can be expressed as:

|   | y |   |   |   |   |   |   |   |   |   |   |   |   |   |   |   |
|---|---|---|---|---|---|---|---|---|---|---|---|---|---|---|---|---|
|   | 0 | 1 | 2 | 3 | 4 | 5 | 6 | 7 | 8 | 9 | a | b | c | d | e | f |
| x 0 | 63 | 7c | 77 | 7b | f2 | 6b | 6f | c5 | 30 | 01 | 67 | 2b | fe | d7 | ab | 76 |
| 1 | ca | 82 | c9 | 7d | fa | 59 | 47 | f0 | ad | d4 | a2 | af | 9c | a4 | 72 | c0 |
| 2 | b7 | fd | 93 | 26 | 36 | 3f | f7 | cc | 34 | a5 | e5 | f1 | 71 | d8 | 31 | 15 |
| 3 | 04 | c7 | 23 | c3 | 18 | 96 | 05 | 9a | 07 | 12 | 80 | e2 | eb | 27 | b2 | 75 |
| 4 | 09 | 83 | 2c | 1a | 1b | 6e | 5a | a0 | 52 | 3b | d6 | b3 | 29 | e3 | 2f | 84 |
| 5 | 53 | d1 | 00 | ed | 20 | fc | b1 | 5b | 6a | cb | be | 39 | 4a | 4c | 58 | cf |
| 6 | d0 | ef | aa | fb | 43 | 4d | 33 | 85 | 45 | f9 | 02 | 7f | 50 | 3c | 9f | a8 |
| 7 | 51 | a3 | 40 | 8f | 92 | 9d | 38 | f5 | bc | b6 | da | 21 | 10 | ff | f3 | d2 |
| 8 | cd | 0c | 13 | ec | 5f | 97 | 44 | 17 | c4 | a7 | 7e | 3d | 64 | 5d | 19 | 73 |
| 9 | 60 | 81 | 4f | dc | 22 | 2a | 90 | 88 | 46 | ee | b8 | 14 | de | 5e | 0b | db |
| a | e0 | 32 | 3a | 0a | 49 | 06 | 24 | 5c | c2 | d3 | ac | 62 | 91 | 95 | e4 | 79 |
| b | e7 | c8 | 37 | 6d | 8d | d5 | 4e | a9 | 6c | 56 | f4 | ea | 65 | 7a | ae | 08 |
| c | ba | 78 | 25 | 2e | 1c | a6 | b4 | c6 | e8 | dd | 74 | 1f | 4b | bd | 8b | 8a |
| d | 70 | 3e | b5 | 66 | 48 | 03 | f6 | 0e | 61 | 35 | 57 | b9 | 86 | c1 | 1d | 9e |
| e | e1 | f8 | 98 | 11 | 69 | d9 | 8e | 94 | 9b | 1e | 87 | e9 | ce | 55 | 28 | df |
| f | 8c | a1 | 89 | 0d | bf | e6 | 42 | 68 | 41 | 99 | 2d | 0f | b0 | 54 | bb | 16 |

As is known, the S-box transformation is can be inverted to form a inverse substitution transformation (Inv_S-box) 108, which can be represented in hexadecimal as follows:

|   | y |   |   |   |   |   |   |   |   |   |   |   |   |   |   |   |
|---|---|---|---|---|---|---|---|---|---|---|---|---|---|---|---|---|
|   | 0 | 1 | 2 | 3 | 4 | 5 | 6 | 7 | 8 | 9 | a | b | c | d | e | f |
| x 0 | 52 | 09 | 6a | d5 | 30 | 36 | a5 | 38 | bf | 40 | a3 | 9e | 81 | f3 | d7 | fb |
| 1 | 7c | e3 | 39 | 82 | 9b | 2f | ff | 87 | 34 | 8e | 43 | 44 | c4 | de | e9 | cb |
| 2 | 54 | 7b | 94 | 32 | a6 | c2 | 23 | 3d | ee | 4c | 95 | 0b | 42 | fa | c3 | 4e |
| 3 | 08 | 2e | a1 | 66 | 28 | d9 | 24 | b2 | 76 | 5b | a2 | 49 | 6d | 8b | d1 | 25 |
| 4 | 72 | f8 | f6 | 64 | 86 | 68 | 98 | 16 | d4 | a4 | 5c | cc | 5d | 65 | b6 | 92 |
| 5 | 6c | 70 | 48 | 50 | fd | ed | b9 | da | 5e | 15 | 46 | 57 | a7 | 8d | 9d | 84 |
| 6 | 90 | d8 | ab | 00 | 8c | bc | d3 | 0a | f7 | e4 | 58 | 05 | b8 | b3 | 45 | 06 |
| 7 | d0 | 2c | 1e | 8f | ca | 3f | 0f | 02 | c1 | af | bd | 03 | 01 | 13 | 8a | 6b |
| 8 | 3a | 91 | 11 | 41 | 4f | 67 | dc | ea | 97 | f2 | cf | ce | f0 | b4 | e6 | 73 |
| 9 | 96 | ac | 74 | 22 | e7 | ad | 35 | 85 | e2 | f9 | 37 | e8 | 1c | 75 | df | 6e |
| a | 47 | f1 | 1a | 71 | 1d | 29 | c5 | 89 | 6f | b7 | 62 | 0e | aa | 18 | be | 1b |
| b | fc | 56 | 3e | 4b | c6 | d2 | 79 | 20 | 9a | db | c0 | fe | 78 | cd | 5a | f4 |
| c | 1f | dd | a8 | 33 | 88 | 07 | c7 | 31 | b1 | 12 | 10 | 59 | 27 | 80 | ec | 5f |
| d | 60 | 51 | 7f | a9 | 19 | b5 | 4a | 0d | 2d | e5 | 7a | 9f | 93 | c9 | 9c | ef |
| e | a0 | e0 | 3b | 4d | ae | 2a | f5 | b0 | c8 | eb | bb | 3c | 83 | 53 | 99 | 61 |
| f | 17 | 2b | 04 | 7e | ba | 77 | d6 | 26 | e1 | 69 | 14 | 63 | 55 | 21 | 0c | 7d |

During operational cycle FX2 (102-2) both S-box 106 and Inv_S-box 108 transformation are performed on the incoming data word (be it clear text to be encoded, cipher text to be decoded, or as part of key expansion). Additionally, the data word is simply passed (via bus 110) to a multiplexer 112. Multiplexer 112 operates to select one of the data word, its S-box transformation or its Inv_S-box transformation for further processing in the next operational cycle. Control of multiplexer 112 is via control line 114-1 and the data selected for further processing will depend upon the instruction decoded (e.g., encode, decode, key expand) by the processor.

During cycle FX3 (102-3) the data word received in this state of the AES algorithm is further processed by a mixed column transformation (MixCol) 124. As is know, the MixCol transformation 124 operates on the data word in the state column-by-column, treating each column as a four-term polynomial, as:

$$\begin{bmatrix} s'_{0,c} \\ s'_{1,c} \\ s'_{2,c} \\ s'_{3,c} \end{bmatrix} = \begin{bmatrix} 02 & 03 & 01 & 01 \\ 01 & 02 & 03 & 01 \\ 01 & 01 & 02 & 03 \\ 03 & 01 & 01 & 02 \end{bmatrix} \begin{bmatrix} s_{0,c} \\ s_{1,c} \\ s_{2,c} \\ s_{3,c} \end{bmatrix}$$

for $0 \leq c < Nb$.

The operation of the MixCol transformation 124 can be understood by the following illustration:

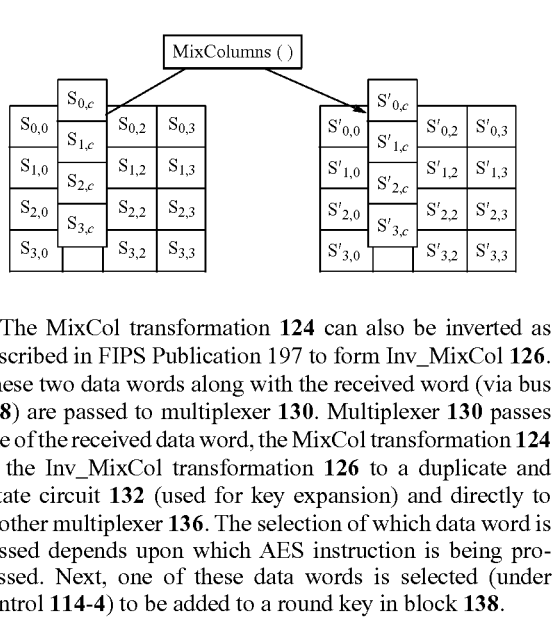

The MixCol transformation 124 can also be inverted as described in FIPS Publication 197 to form Inv_MixCol 126. These two data words along with the received word (via bus 128) are passed to multiplexer 130. Multiplexer 130 passes one of the received data word, the MixCol transformation 124 or the Inv_MixCol transformation 126 to a duplicate and rotate circuit 132 (used for key expansion) and directly to another multiplexer 136. The selection of which data word is passed depends upon which AES instruction is being processed. Next, one of these data words is selected (under control 114-4) to be added to a round key in block 138.

As previously mentioned, round keys are values derived from an initial cipher key using a key expansion routine that will be hereinafter described. In one embodiment, the round key is added by an exclusive or (XOR) operation in the add round key block 138. The output data word 140 exits the AES unit 100 during clock cycle FX4 (102-4) for further processing or storage.

The round key to be added in block 138 is provided during cycle FX2 (102-2) by multiplexer 122 from input (B) 116 (also a 64 bit bus). Multiplexer 122 also receives as inputs a 64 bit data word of all zeros 120 and a 64 bit word generated by an 8 bit word received on input (C) 118 processed into 64 bits by extending zeros into the upper bits in Zero Ext. block 119. These latter two inputs of multiplexer 122 are used during the key expansion operation, while in encode and decode operations, the round key is passed through multiplexer 122 to the Add Round Key block 138 via bus 137. There, the state data word provided by multiplexer 136 is XOR'ed to provide an output data word 140 during cycle FX4 (102-4). Thus, a new data word 140 is output every cycle providing a single cycle throughput via the architecture of the AES unit 100. Also, only two cycles (FX2 and FX3) are required for the portion of the AES Cipher performed by the AES unit 100 for processing either the encode or decode AES algorithm. This provides a two-cycle latency per instruction within the AES unit 100, however, those of ordinary skill in the art will appreciate that the overall latency will depend upon where on the processor core the AES unit 100 resides. That is, other operations (e.g., data moves, register renaming or other operations) may increase the overall latency if the AES unit is located on any particular processor core at a distant location from the source or destination registers or depends upon bus gating or traffic control to move data words to and from the AES unit 100.

AES Key Expansion

Figure 3:
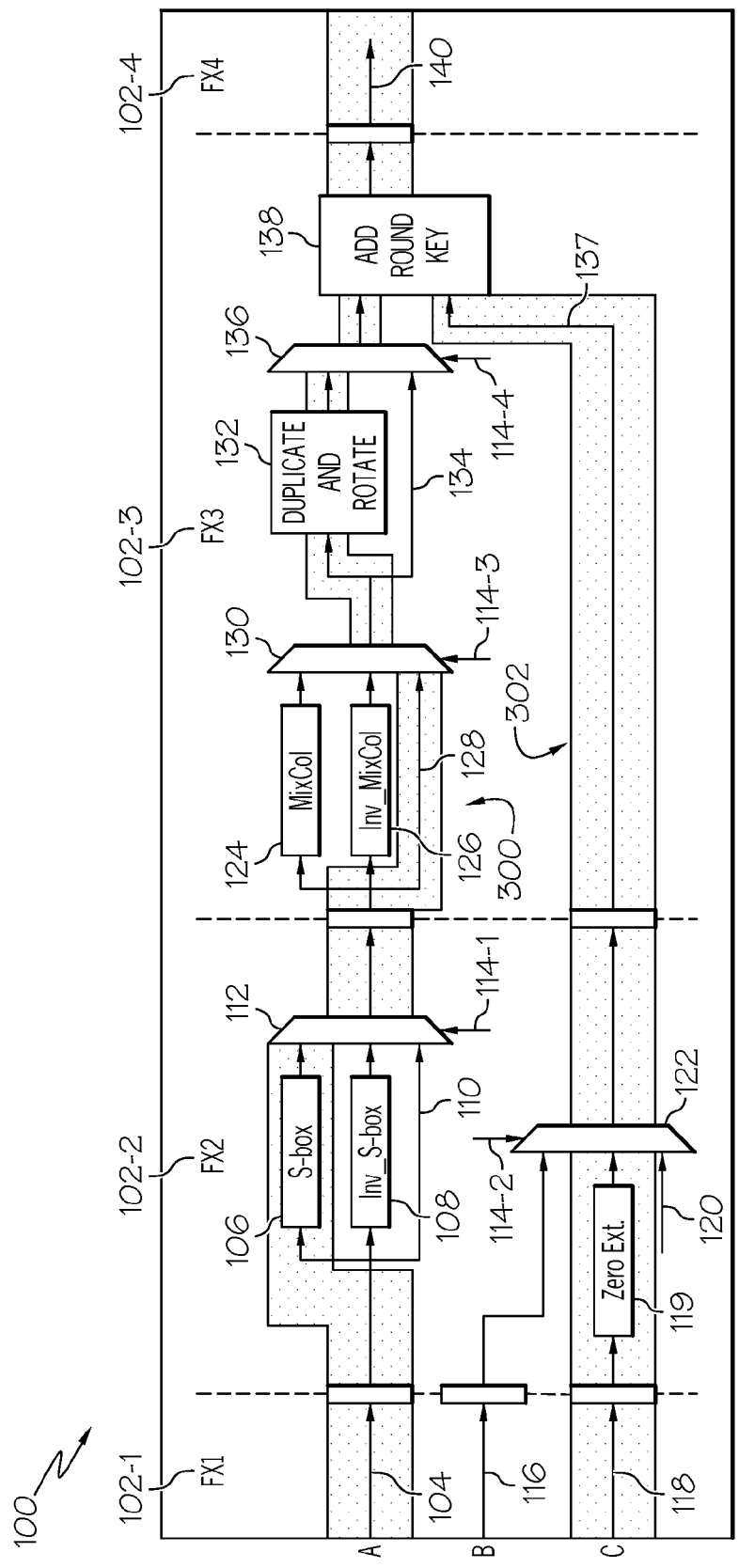
FIG. 3 is the block diagram of FIG. 2 illustrating the data flow for executing an encoding key expansion instruction in accordance with an exemplary embodiment of the present disclosure.

Referring now to FIG. 3, the data flows 300 and 302 for the key expansion for encoding are illustrated. For ease of understanding, common elements with FIG. 2 have common reference numerals and only those elements involved for encode key expansion are labeled. During cycle FX1 (102-1) a 64 bit data word is received via input 104 and an 8bit word is received via input (C) 118, which is a portion of the operation code for the AES instruction. Depending upon the round, the input A data word is either 64 bits of the initial key or 64 bits of the prior key generated in the previous round. Depending upon the cipher level, either 10, 12 or 14 cycles are required to generate all of the round keys needed to encode a data word.

During cycle FX2 (102-2) an S-box transformation 106 is performed on the data word, while the input C byte passes through the Zero Ext. block 119 to provide a 64 bit data word having the upper bits (bits [63:8]) set to zero and the lower bits [7:0] comprising the data word from Input C. This data word is then passed via multiplexer 122 to bus 137. In the next cycle FX3 (102-3) processing of the data word from the multiplexer 130 continues by passing the data word (128) through multiplexer 136 to the duplicate and rotate block 132. In the duplicate and rotate block 132, double-word 1 (upper 32 bits) of the 64 bit block is duplicated into double-word 0 (lower 32 bits) and double-word 1 is then rotated per the AES Cipher. The result of the duplicate and rotate block 132 is routed directly to be added (XOR'ed in block 138) with the expanded input C byte via multiplexer 136 and is output 140 during cycle FX4 (102-4). The multiplexer controls 114-1, 114-2, 114-3 and 114-4 are provided by the processor upon decoding an key expansion instruction (for example, a AESKEYGENASSIST instruction) to generate the round keys used for AES operations, which may be stored in any convenient location, such as the XMM registers.

Figure 4:
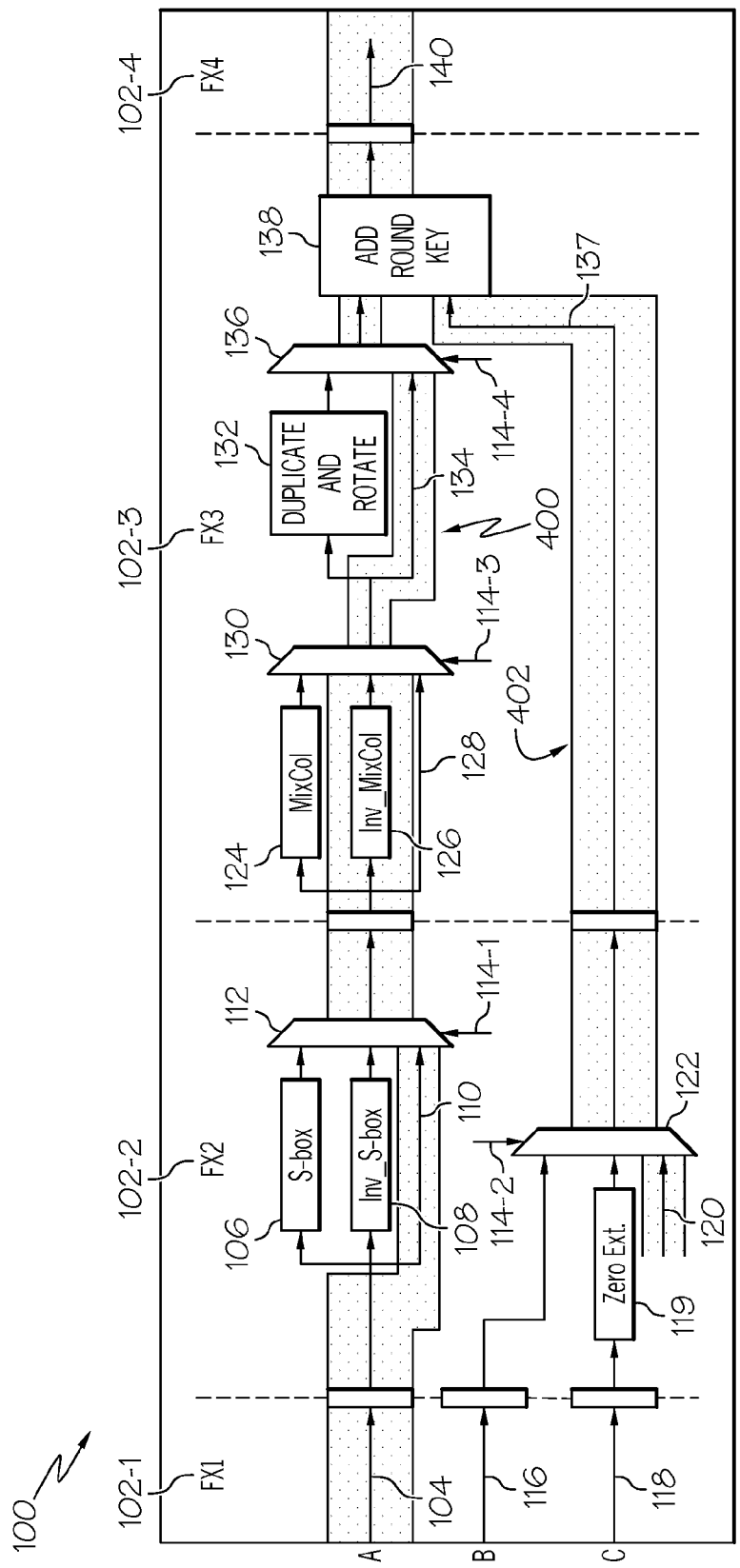
FIG. 4 is the block diagram of FIG. 2 illustrating the data flow for executing a decoding key expansion instruction in accordance with an exemplary embodiment of the present disclosure.

Referring now to FIG. 4, the data flows 400 and 402 for the key expansion for decoding are illustrated. For ease of understanding, common elements with FIG. 2 have common reference numerals and only those elements involved for encode key expansion are labeled. For the AES Cipher, the decode key expansion comprises a function to convert the encode keys from the AESKEYGENASSIST instruction (see FIG. 3) into round keys for use for decoding a data block of cipher text. During cycle FX1 (102-1) a data word is received via bus 104. Depending upon the round, the input A data word is either 64 bits of the initial key or 64 bits of the prior key generated in the previous round. Depending upon the cipher level, either 10, 12 or 14 cycles are required to generate all of the round keys needed to decode a data word. During cycle FX2 (102-2) the data word is passed via bus 110 and multiplexer 112, while a 64 bit zero word 120 (i.e., all 64 bits have a zero value) is placed on bus 137 by multiplexer 122. In the next cycle FX3 (102-3) processing of the data word continues with an Inv_MixCol transformation 126, the result of which is routed from multiplexer 130 directly (134) to be added (XOR'ed in block 138) with the 64 bit zero word via multiplexer 136. Since that data word is XOR'ed with a 64 bit zero word, the effect of the add round key block 138 is simply to pass the data word to the output bus 140 during cycle FX4 (102-4). That is, for ease of implementation, the add round key (138) function is performed even during key expansion. This microarchitecture avoids the need for separate circuitry to perform the key expansion function. The multiplexer control 114-1, 114-2, 114-3 and 114-4 are provided by the processor upon decoding a decode key expansion instruction (for example, an AESIMC instruction) to generate the round keys used for AES decode operations, which may be stored in any convenient location, such as the XMM registers.

Shift Rows

For AES encoding, a shift row function is performed prior to a data word being input to the AES unit 100. Unlike other AES functions (e.g., subituation transformation, mix column transformation and adding round key), the shift row (and inverse) function must be performed on the entire 128 bit block. For AES decoding, an inverse shift row function is performed prior to a data word being input to the AES unit 100 (which processes the upper or lower 64 bits of the 128 bit block). In one embodiment, the shift rows (or inverse shift rows) operation, is performed via a conventional x86 permute unit. In other embodiments, the shift rows (or inverse shift rows) function may be performed by using conventional shift registers as is know in the art. In a shift row transformation, the bytes in the last three rows of a state are cyclically shifted over different numbers of bytes (offsets). The shift row transformation can be illustrated as follows:

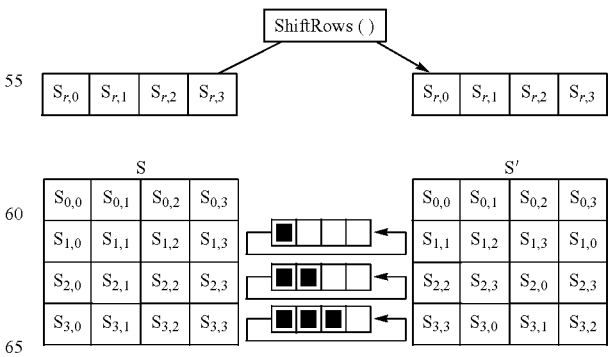

While the inverse shift row transformation can be illustrated as:

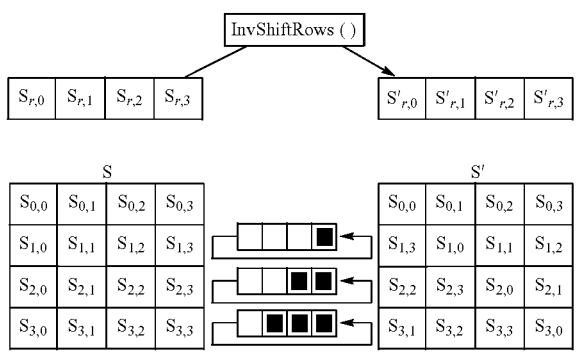

AES Encoding

Figure 5:
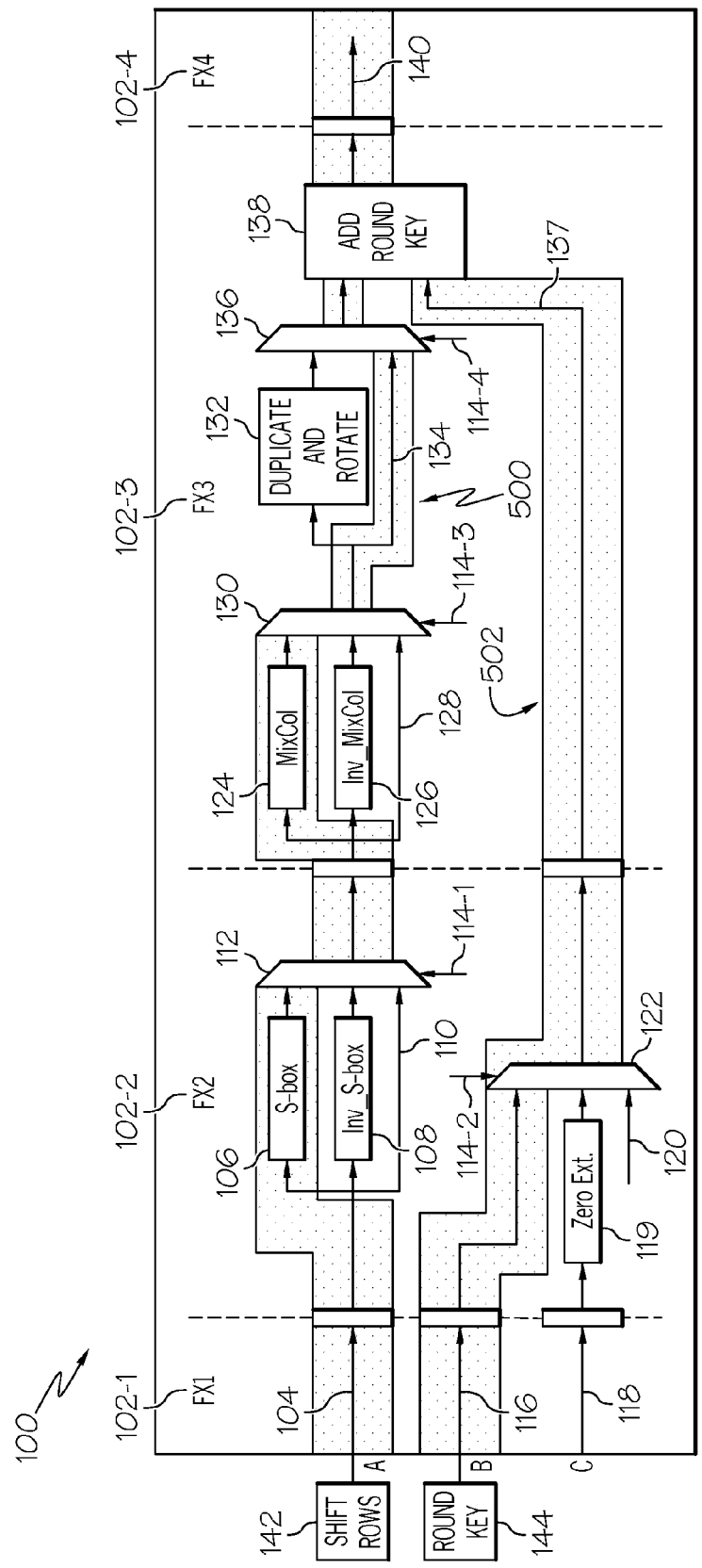
FIG. 5 is the block diagram of FIG. 2 illustrating the data flow for executing an encoding instruction in accordance with an exemplary embodiment of the present disclosure.

Referring now to FIG. 5, the encoding data flows 500 and 502 are illustrated. For ease of understanding, common elements with FIG. 2 have common reference numerals and only those elements involved for encoding are labeled. Also, while only one round of encoding is described, it will be appreciated that as many rounds as are needed for the level of encryption (10, 12 or 14 rounds) are performed.

During cycle FX1 (102-1) a data word to be encoded is received at input 104 from the shift rows unit 142 (which is either the upper or lower 64 bits of the 128 bit AES block), and a round key is received via input 116. During cycle FX2 (102-2) an S-box transformation 106 is performed on the data word, while the round key is passed via multiplexer 122 to bus 137. Also during cycle FX2 (102-2) an Inv_S-box transformation 108 is performed on the data word, however, it is not passed by multiplexer 112 for an encode operation. In the next cycle FX3 (102-3) processing of the data word continues with a MixCol transformation 124, the result of which is routed directly from the multiplexer 130 directly (134) to be added (XOR'ed in block 138) with the round key via multiplexer 136. Note that an Inv_MixCol transformation 126 is also performed on the data word, however, it is not passed by multiplexer 130 for an encode operation. The output 140 is provided from the Add Round Key block 138 during FX4 (102-4). The multiplexer control 114-1, 114-2, 114-3 and 114-4 are provided by the processor upon decoding an encode instruction (for example, a AESENC instruction) to achieve the single cycle throughput and two-cycle latency as described above. The above process is repeated for each round key until the last round is reached (that is, the $10^{th}$, $12^{th}$, or $14^{th}$ round). At that point, the data flow changes for the last round of encoding as discussed in conjunction with FIG. 6.

Figure 6:
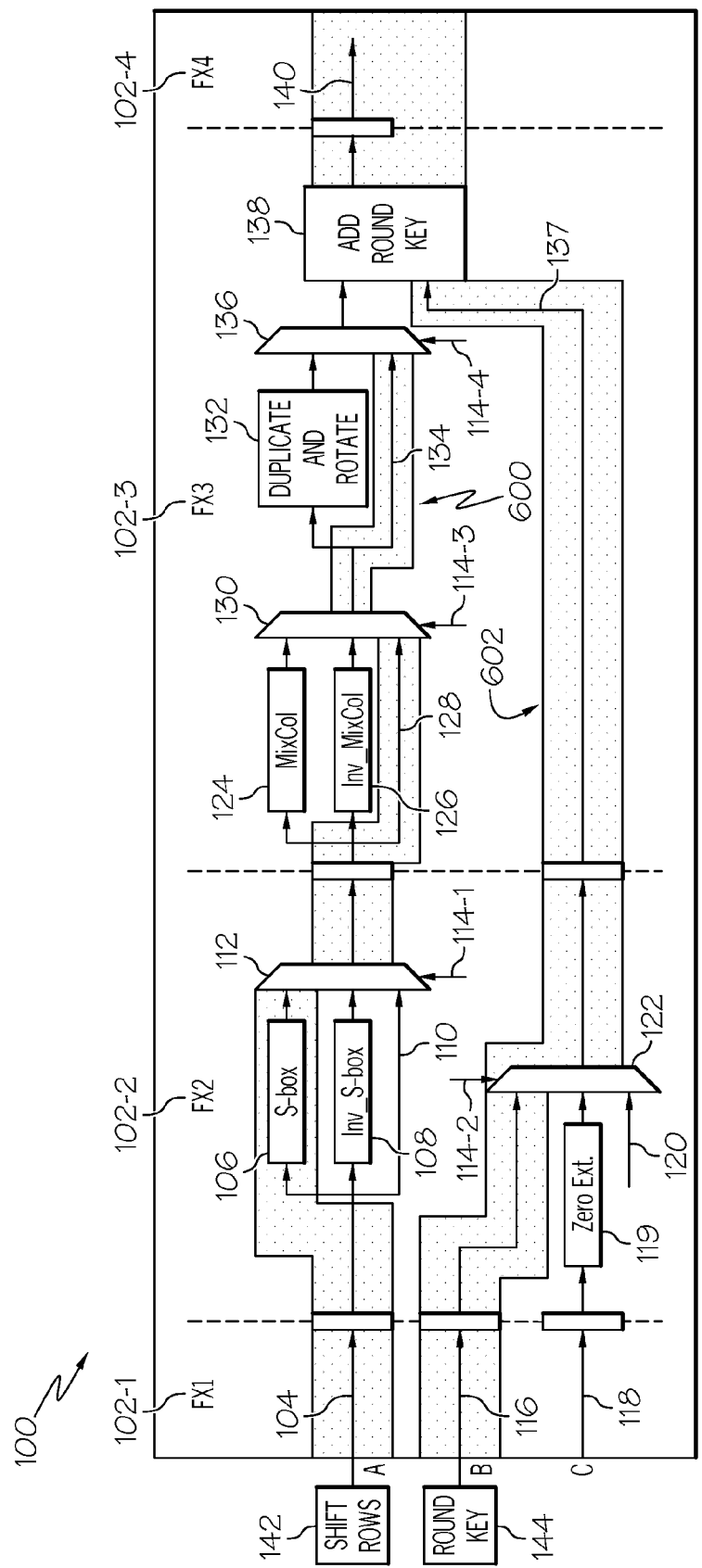
FIG. 6 is the block diagram of FIG. 2 illustrating the data flow for executing a last round of encoding instruction in accordance with an exemplary embodiment of the present disclosure.

Referring now to FIG. 6, the data flows 600 and 602 are illustrated for the last encoding round. As with prior figures, common elements with FIG. 2 have common reference numerals and only those elements involved for the last round of encoding are labeled. During cycle FX1 (102-1) a data word to be encoded is received at input 104 from the shift rows unit 142 (again 64 bits are process in the AES unit 100), and a round key is received via input 116. During cycle FX2 (102-2) an S-box transformation 106 is performed on the data word, while the last round key is passed via multiplexer 122 to bus 137. Also during cycle FX2 (102-2) an Inv_S-box transformation 108 is performed on the data word, however, it is not passed by multiplexer 112 for an encode operation. In the next cycle FX3 (102-3) the S-box result is routed directly (128/130 and 134/136) to be added (XOR'ed in block 138) with the round key. The output 140 is provided from the Add Round Key block 138 during FX4 (102-4). The multiplexer control 114-1, 114-2, 114-3 and 114-4 are provided by the processor upon decoding a last encode instruction (for example, a AESENLAST instruction) to conclude the encoding of a passage of clear text into cipher text.

AES Decoding

Figure 7:
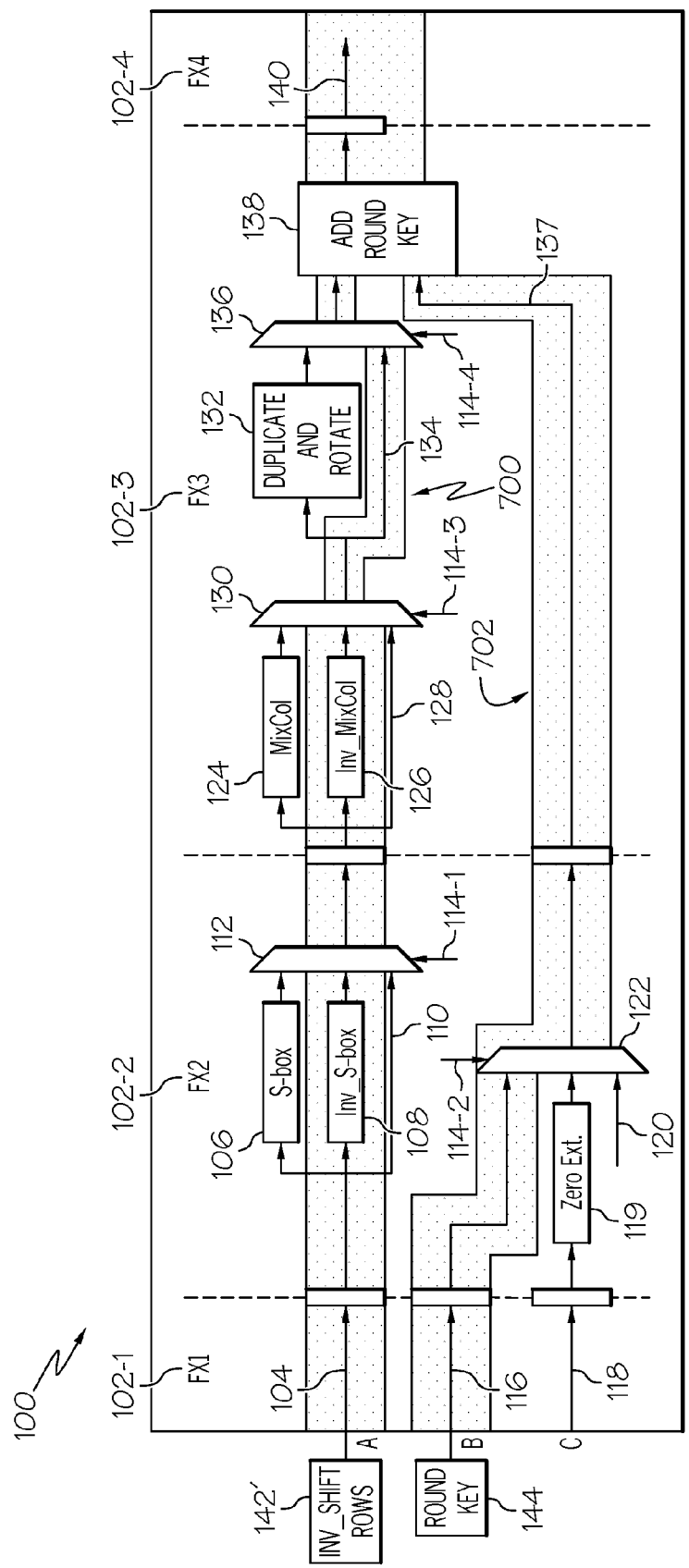
FIG. 7 is the block diagram of FIG. 2 illustrating the data flow for executing a decoding instruction in accordance with an exemplary embodiment of the present disclosure.

Referring now to FIG. 7, the decoding data flows 700 and 702 are illustrated. For ease of understanding, common elements with FIG. 2 have common reference numerals and only those elements involved for decoding are labeled. Also, while only one round of decoding is described, it will be appreciated that as many rounds as are needed for the level of encryption (10, 12 or 14 rounds) are performed.

During cycle FX1 (102-1) a data word to be decoded is received at input 104 from the inverse shift rows unit 142' (which is either the upper or lower 64 bits of the 128 bit AES block), and a round key is received via input 116. During cycle FX2 (102-2) an Inv_S-box transformation 108 is performed on the data word, while the round key is passed via multiplexer 122 to bus 137. Also during cycle FX2 (102-2) an S-box transformation 106 is performed on the data word, however, it is not passed by multiplexer 112 for an decode operation. In the next cycle FX3 (102-3) processing of the data word continues with a Inv_MixCol transformation 126, the result of which is routed directly from the multiplexer 130 directly (134) to be added (XOR'ed in block 138) with the round key via multiplexer 136. Note that a MixCol transformation 124 is also performed on the data word, however, it is not passed by multiplexer 130 for an decode operation. The output 140 is provided from the Add Round Key block 138 during FX4 (102-4). The multiplexer control 114-1, 114-2, 114-3 and 114-4 are provided by the processor upon decoding an decode instruction (for example, a AESDEC instruction) to achieve the single cycle throughput and two-cycle latency as described above. The above process is repeated for each round key until the last round is reached (that is, the $10^{th}$, $12^{th}$ or $14^{th}$ round). At that point, the data flow changes for the last round of decoding as discussed in conjunction with FIG. 8.

Figure 8:
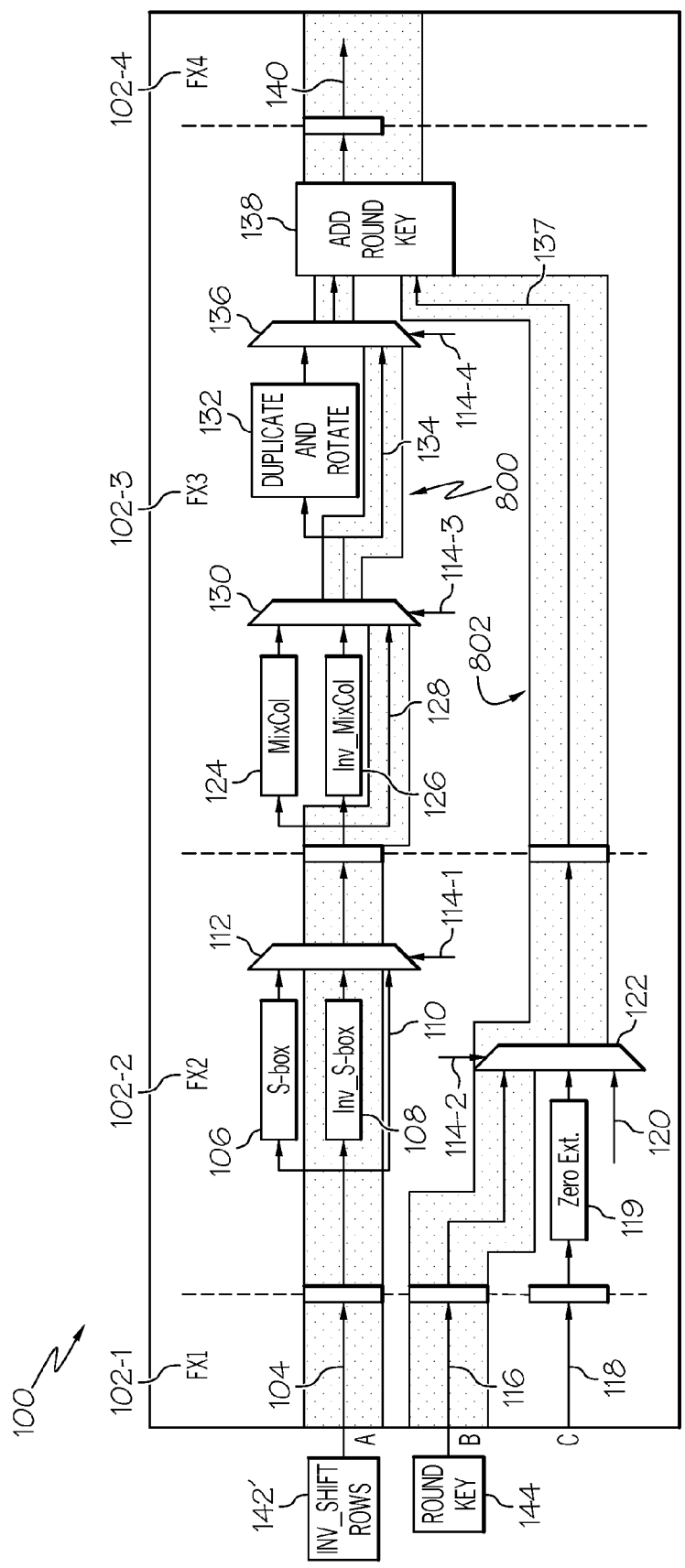
FIG. 8 is the block diagram of FIG. 2 illustrating the data flow for executing a last round of decoding instruction in accordance with an exemplary embodiment of the present disclosure.

Referring now to FIG. 8, the data flows 800 and 802 are illustrated for the last decoding round. As with prior figures, common elements with FIG. 2 have common reference numerals and only those elements involved for the last round of decoding are labeled. During cycle FX1 (102-1) a data word to be encoded is received at input 104 from the inverse shift rows unit 142' (again 64 bits of the 128 bit AES block), and a the last round key is received via input 116. During cycle FX2 (102-2) an Inv_S-box transformation 108 is performed on the data word, while the last round key is passed via multiplexer 122 to bus 137. Also during cycle FX2 (102-2) an S-box transformation 106 is performed on the data word, however, it is not passed by multiplexer 112 for a decode operation. In the next cycle FX3 (102-3) the Inv_S-box result is routed directly (128/130 and 134/136) to be added (XOR'ed in block 138) with the round key. The output 140 is provided from the Add Round Key block 138 during FX4 (102-4). The multiplexer control 114-1, 114-2, 114-3 and 114-4 are provided by the processor upon decoding a last decode instruction (for example, a AESDECLAST instruction) to conclude the decoding of a passage of cipher text into clear text.

Accordingly, the architecture of the present disclosures provides full implementation of the Advanced Encryption Standard while offering single (every) cycle throughput and two-cycle latency in the AES unit 100 for all but the shift row function of the AES algorithm. This results in substantial power savings and simplicity of implementation of a processor core.

Various processor-based devices may advantageously use the processor (or computational unit) of the present disclosure, including laptop computers, digital books, printers, scanners, standard or high-definition televisions or monitors and standard or high-definition set-top boxes for satellite or cable programming reception. In each example, any other circuitry necessary for the implementation of the processor-based device would be added by the respective manufacturer. The above listing of processor-based devices is merely exemplary and not intended to be a limitation on the number or types of processor-based devices that may advantageously use the processor (or computational unit) of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing exemplary embodiments, it being understood that various changes may be made in the function and arrangement of elements described in an exemplary embodiment without departing from the scope of the disclosure as set forth in the appended claims and their legal equivalents.

What is claimed is:

1. A method, comprising:
performing an advanced encryption standard shift row function on a received data word to provide a shifted data word;
processing the shifted data word during a first cycle in an advanced encryption standard unit of a processor using a substitution transformation;
processing the shifted data word during the first cycle in the advanced encryption standard unit using an inverse substitution transformation;
selecting with a multiplexer one of the result of the substitution transformation and the result of the inverse substitution transformation; and
during a next cycle in the advanced encryption standard unit of the processor processing the selected result from the multiplexer using a mixed column transformation; and
adding a result of the mixed column transformation to a round key to provide one round of an encoded digital word compliant with the advanced encryption standard.

2. The method claim 1, further comprising processing during the next cycle an inverse mixed column transformation in the advanced encryption standard unit of the processor.

3. The method claim 1, further comprising generating the round key prior to performing the advanced encryption standard encoding process.

4. The method of claim 1, which is repeated for multiple rounds in the advanced encryption standard unit of the processor to encode the received data word.

5. The method claim 4, further comprising generating round keys for each of the multiple rounds prior to the advanced encryption standard encoding process.

6. A method, comprising:
performing an advanced encryption standard inverse shift row function on a received data word to provide a shifted data word;
processing the shifted data word during a first cycle in an advanced encryption standard unit of a processor using a substitution transformation;
processing the shifted data word during a first cycle in an advanced encryption standard unit of a processor using an inverse substitution transformation
selecting with a multiplexer one of the result of the substitution transformation and the result of the inverse substitution transformation; and
during a next cycle in the advanced encryption standard unit of the processor processing the selected result from the multiplexer using an inverse mixed column transformation and adding a result of the inverse mixed column transformation to a round key to provide one round of an decoded digital word compliant with the advanced encryption standard.

7. The method claim 6, further comprising processing during the next cycle a mixed column transformation in the advanced encryption standard unit of the processor.

8. The method claim 6, further comprising generating the round key prior to performing the advanced encryption standard decoding process.

9. A method of claim 6, which is repeated for multiple rounds in the advanced encryption standard unit of the processor to decode the received data word.

10. The method claim 9, further comprising generating round keys for each of the multiple rounds prior to the advanced encryption standard decoding process.

11. A processor, comprising:
a first multiplexer receiving during a first cycle a data word, a substitution transformation of the data word and inverse substitution transformation of the data word to provide a first output;
a second multiplexer receiving during a next cycle, the first output, a mixed column transformation of the first output and an inverse mixed column transformation of the first output to provide a second output; and
means for adding a round key to the second output to provide one round of an encoded or decoded digital word compliant with the advanced encryption standard.

12. The processor of claim 11, further comprising a third multiplexer providing the round key to the means for adding the round key.

13. The processor of claim 12, wherein the third multiplexer provides a zero data word to the means for adding the round key during a key expansion function.

* * * * *